(12) United States Patent
Maruyama

(10) Patent No.: US 8,514,935 B2
(45) Date of Patent: Aug. 20, 2013

(54) IMAGE CODING APPARATUS, IMAGE CODING METHOD, INTEGRATED CIRCUIT, AND CAMERA

(75) Inventor: Yuki Maruyama, Osaka (JP)

(73) Assignee: Panasonic Corporation, Osaka (JP)

(*) Notice: Subject to any disclaimer, the term of this patent is extended or adjusted under 35 U.S.C. 154(b) by 1057 days.

(21) Appl. No.: 12/510,827

(22) Filed: Jul. 28, 2009

(65) Prior Publication Data

US 2010/0026829 A1    Feb. 4, 2010

(30) Foreign Application Priority Data

Jul. 29, 2008   (JP) ................................. 2008-194471
Jul. 24, 2009   (JP) ................................. 2009-173752

(51) Int. Cl.
*H04N 7/18*    (2006.01)

(52) U.S. Cl.
USPC ................................. 375/240.12; 375/240.15

(58) Field of Classification Search
USPC ....................................... 375/240.01–240.29
See application file for complete search history.

(56) References Cited

U.S. PATENT DOCUMENTS

| | | | |
|---|---|---|---|
| 7,277,486 B2 | 10/2007 | Srinivasan et al. | |
| 7,463,684 B2 | 12/2008 | Srinivasan et al. | |
| 7,809,059 B2 * | 10/2010 | Yin et al. | 375/240.12 |
| 8,311,121 B2 * | 11/2012 | Pandit et al. | 375/240.24 |
| 2003/0206583 A1 | 11/2003 | Srinivasan et al. | |
| 2003/0206592 A1 | 11/2003 | Srinivasan et al. | |
| 2003/0206593 A1 | 11/2003 | Srinivasan et al. | |
| 2008/0037657 A1 | 2/2008 | Srinivasan et al. | |
| 2008/0089404 A1 | 4/2008 | Okazaki et al. | |

FOREIGN PATENT DOCUMENTS

| | | |
|---|---|---|
| EP | 1 414 245 | 4/2004 |
| EP | 1 798 983 | 6/2007 |
| EP | 1 798 984 | 6/2007 |
| EP | 1 798 985 | 6/2007 |
| EP | 1 798 986 | 6/2007 |
| EP | 1 798 987 | 6/2007 |
| EP | 1 798 988 | 6/2007 |

(Continued)

OTHER PUBLICATIONS

Sang Hyun Kim, Fast local motion-compensation algorithm for video sequences with brightness variations, IEEE Transactions on Circuits and Systems for Video Technology, IEEE, 2003. 4, vol. 13, No. 4, pp. 289-299.

(Continued)

*Primary Examiner* — Andy Rao
(74) *Attorney, Agent, or Firm* — Wenderoth, Lind & Ponack, L.L.P.

(57) ABSTRACT

An image coding apparatus including an accumulating unit which accumulates a reference image, a predicted image generating unit which generates a predicted image of the current image to be coded by performing motion compensation with weighted prediction or motion compensation without the weighted prediction, and a coding unit which codes a difference between the predicted image generated by the predicted image generating unit and the current image to be coded. The image coding apparatus also includes a determining unit which determines whether or not the current image to be coded is included in a picture group which is a group of successive pictures and indicates motion equal to or larger than a predetermined amount of motion and which generates the predicted image by performing the motion compensation with the weighted prediction when it is determined that the current image to be coded is not included in the picture group.

8 Claims, 13 Drawing Sheets

(56) References Cited

FOREIGN PATENT DOCUMENTS

| | | |
|---|---|---|
| EP | 1 798 989 | 6/2007 |
| EP | 2 355 518 | 8/2011 |
| EP | 2 355 519 | 8/2011 |
| EP | 2 355 520 | 8/2011 |
| EP | 2 355 521 | 8/2011 |
| EP | 2 355 522 | 8/2011 |
| EP | 2 355 523 | 8/2011 |
| EP | 2 357 827 | 8/2011 |
| EP | 2 357 828 | 8/2011 |
| JP | 2002-051341 | 2/2002 |
| JP | 2004-007377 | 1/2004 |
| JP | 2004-007650 | 1/2004 |
| JP | 2007-306619 | 11/2007 |
| JP | 2008-005145 | 1/2008 |
| JP | 2008-259018 | 10/2008 |

OTHER PUBLICATIONS

Yanfei Shen et al., Adaptive weighted prediction in video coding, IEEE International Conference on Multimedia and Expo (ICME '04), IEEE, 2004 . 6, vol. 1, pp. 427-430.

ITU-T Recommendation H.264 (Nov. 2007), Series H: Audiovisual and Multimedia Systems, pp. i-xix and 1-540.

* cited by examiner

IMAGE CODING APPARATUS, IMAGE CODING METHOD, INTEGRATED CIRCUIT, AND CAMERA

BACKGROUND OF THE INVENTION (1) Field of the Invention

The present invention relates to an image coding apparatus which compression-codes images and records the compression-coded images on storage media such as optical discs, magnetic disks, and flash memories and others, and an image coding method. More particularly, the present invention relates to an image coding apparatus which performs the compression-coding in the MPEG-4 AVC/H.264 compression-coding standard, an image coding method, an image coding integrated circuit, and a camera.

(2) Description of the Related Art

Along with the progress in the digital video technology, there has been progress in techniques for compression-coding the digital video data in response to the increasing the data amount. The compression-coding technology specialized for the video data making use of the video data shows the progress.

Furthermore, improvement in the processing capacity of the information processing devices such as computers allows complex computations for the compression-coding techniques, which has significantly been raising the compression rate of video data. More specifically, the compression-coding technique adopted for the satellite and terrestrial digital high-definition broadcast is called the Moving Picture Experts Group 2 (MPEG-2). For example, in the satellite digital high-definition digital broadcast, the video data is compressed to approximately 1/30 using the MPEG-2.

The MPEG-4 AVC/H.264 (hereinafter referred to as the H.264) which is one of the video compression-coding standards standardized after the MPEG-2 is considered to achieve a compression rate approximately twice higher than that of the MPEG-2. The H.264 has also been adopted as a moving picture compression-coding method for the Blu-ray, one of the standards for optical discs, and for the Advanced Video Codec High Definition (AVCHD) which is a standard for recording high-definition video by a video camera, and is expected to be used in a wide range of fields.

However, as disclosed in Non-patent Reference 1 (ITU-T Recommendation H.264), the H.264 achieves high compression rate by implementing many compression-coding techniques and combining the techniques. Accordingly, the computation amount significantly increases compared to that of the MPEG-2 as well.

In general, in the compression-coding of a moving picture, the amount of information is compressed by reducing redundancy in temporal and spatial directions. More specifically, in inter prediction coding which aims for reducing temporal redundancy, a preceding or following picture is referred to in order to estimate motion (motion vector estimation) and to generate a predicted image (motion compensation) per block. Subsequently, a difference value between the generated predicted image and a current picture to be coded is coded.

Another compression-coding technique for compressing the moving picture is a weighted prediction. In the motion compensation with the weighted prediction, the pixel value of the reference picture "pred" is multiplied by the weighting value "w", and the offset value "o" is added. Accordingly, the predicted pixel value "p" is "w×pred+o". On the other hand, in the motion compensation without the weighted prediction, the predicted pixel value "p" is the pixel value of the reference picture "pred".

Accordingly, in the weighted prediction, brightness of the image can be predicted using the weighting value "w" and the offset value "o". In other words, a highly precise predicted image can be generated by predicting the change in the brightness of the image and determining the weighting value "w" and the offset value "o" based on the predicted change in the brightness of the image. Therefore, it is possible to improve the coding efficiency for coding fading video and live video which includes frequent flashing.

Note that the weighted prediction has two modes, i.e., the Implicit mode and the Explicit mode. When the motion compensation using the Implicit mode is selected, the weighting value "w" and the offset value "o" are calculated using the calculation method specified by the standard. When the motion compensation using the Explicit mode is selected, the encoder which performs compression-coding perform the coding with the weighting value "w" and the offset value "o" on the stream header of the coded stream. Thus, it is possible to specify the weighting value "w" and the offset value "o" within the acceptable range specified by the standard.

For example, Patent Reference 1 (Japanese Unexamined Patent Application Publication No. 2007-306619) discloses a technique for determining whether or not the weighted prediction is performed by determining whether or not the moving picture to be coded is a fading moving picture. More specifically, it is determined whether the moving picture to be coded is a fading moving picture or not by detecting a change in the luminance value of the image.

This allows switching between applying the weighted prediction and not applying the weighted prediction, and thereby the coding efficiency can be improved more effectively.

SUMMARY OF THE INVENTION

However, there is a problem where the technique disclosed in Patent Reference 1 reduces the image quality and the coding efficiency. The following specifically describes the problem.

With the technique disclosed in Patent Reference 1, whether or not the current moving picture to be coded is fading is determined by detecting the change in the luminance value. However, although there is a change in the luminance values of the fading moving picture, it does not necessarily mean that the moving picture where the luminance values change is always fading.

Furthermore, the weighted prediction contributes to the improvement of the coding efficiency when the luminance values are changing in the entire image. However, the weighted prediction could possibly reduce the image quality and the coding efficiency in other cases. For this reason, as with the technique disclosed in Patent Reference 1, there is a case where the image quality and coding efficiency is reduced, since merely detecting the change in the luminance value is not sufficient.

Note that, in one conceivable conventional method, two types of motion compensation, that is, the motion compensation without the weighted prediction and the motion compensation with the weighted prediction are provided. Both the two types of motion compensations for each macroblock are performed to select the motion compensation method which achieves higher coding efficiency and the coding is performed with the selected method. However, this method increases the process amount necessary for coding, and causes a problem such as the increase in circuit scale and consumption electricity.

The present invention has been conceived in order to solve the problems, and it is an object of the present invention to provide an image coding apparatus and an image coding method that can improve the image quality and coding efficiency while achieving reduction of the computation amount, acceleration of the process, and reduction in the consumption electricity upon the image compression-coding process.

In order to achieve the abovementioned object, the image coding apparatus according to the present invention is An image coding apparatus which compression-codes moving picture data including a current image to be coded, the image coding apparatus including: an accumulating unit which accumulates a reference image; a predicted image generating unit which generates a predicted image of the current image to be coded, based on the reference image accumulated in the accumulating unit, by performing motion compensation with weighted prediction or motion compensation without the weighted prediction, the weighted prediction being a process of adding a predetermined offset value to a pixel value of the reference image; a coding unit which codes a difference between the predicted image generated by the predicted image generating unit and the current image to be coded; and a determining unit which determines whether or not the current image to be coded is included in, among the moving picture data, a picture group which is a group of successive pictures and indicates motion equal to or larger than a predetermined amount of motion, in which the predicted image generating unit is which generates the predicted image by performing the motion compensation without the weighted prediction when the determining unit determines that the current image to be coded is included in the picture group, and to generate the predicted image by performing the motion compensation with the weighted prediction when it is determined that the current image to be coded is not included in the picture group.

This allows determining whether or not the current image to be coded is included in the picture group which is a group of successive pictures and indicates the motion equal to or higher than the predetermined amount of motion and selecting whether or not the weighted prediction is performed based on the determination result, Therefore, the image quality and the coding efficiency can be improved. Furthermore, it is possible to reduce the necessary computation amount compared to the case where the two types of the motion compensations, that is, the motion compensation without the weighted prediction and the motion compensation with the weighted prediction are performed. Furthermore, determining whether or not there is motion further improves the precision of the prediction compared to the case where the change in the luminance values is detected, and thereby increasing the coding efficiency.

Furthermore, the determining unit may obtain imaging information which indicates an operation of an imaging apparatus when the current image to be coded was captured, and to determine whether or not the current image to be coded is included in the picture group based on obtained imaging information.

This allows determining whether or not there is motion according to the operation of the imaging apparatus, which improves the precision of the prediction, and thereby improving the coding efficiency.

Furthermore, the imaging information indicates whether or not the imaging apparatus was zooming, panning or tilting, and the determining unit may determine that the current image to be coded is included in the picture group when the obtained imaging information indicates that the imaging apparatus was zooming, panning, or tilting.

With this, the image that has been captured when the imaging apparatus was zooming, panning, or tilting is coded without using the weighted prediction, and thereby increasing the coding efficiency. This is because, it is preferable to use the weighted prediction for the case where the luminance values change in an entire frame such as the fading image and the image with frequent flashing, and it is not preferable to use the weighted prediction for the image with a large motion due to the reduction in the coding efficiency caused by the weighted prediction.

Furthermore, the imaging information indicates whether or not the imaging apparatus is changing an aperture, and the determining unit may determine that the current image to be coded is included in the picture group when the obtained imaging information indicates that the aperture was not changing, or when the obtained imaging information indicates that the aperture is changing and that the imaging apparatus was zooming, panning, or tilting.

This reduces the computation amount by using the change in the aperture as well.

Furthermore, the image coding apparatus may further includes a parameter setting unit which sets the offset value at a predetermined value for each of at least one of the reference image to which the current image to be coded refers, in which the moving picture data is interlaced moving picture data, the parameter setting unit sets, at 0, the offset value of a reference image which has parity opposite to parity of the current image to be coded when the determining unit determines that the current image to be coded is included in the picture group, and the predicted image generating unit may generate the predicted image by adding the offset value set by the parameter setting unit and the reference image, when the determining unit determines that the current image to be coded is included in the picture group.

With this, when the moving picture data is the interlaced image data, even when it is determined that the current image to be coded is an image with motion, setting the offset value "o" at 0 when the reference image has the opposite parity prevents the weighted prediction from being performed. This allows determining whether or not the current image to be coded is with motion or not, and thereby improving the image quality and the coding efficiency.

Furthermore, the determining unit may determine that the current image to be coded is included in the picture group when a characteristic amount calculated based on the current image to be coded and a previous image that is to be coded is equal to or larger than a predetermined threshold, and determine that the current image to be coded is not included in the picture group when the characteristic amount is smaller than the threshold.

With this, it is determined whether or not the weighted prediction is performed based on the moving picture data including the current image to be coded. This allows a more precise determination on whether or not the current picture to be coded is with motion or not, and thereby improving the image quality and the coding efficiency.

Furthermore, the determining unit determines that the current image to be coded is an image included in the picture group when the characteristic amount calculated based on the previously coded picture is equal to or larger than the predetermined threshold value, and may determine that the current image to be coded is not included in the picture group when the characteristic amount is smaller than the threshold.

With this, it is determined whether or not the weighted prediction is performed based on the previously coded picture, which allows highly precise determination on whether or not the current picture to be coded is an image with motion at low processing amount. This improves the image quality and the coding efficiency.

Furthermore, the image coding apparatus may compression-codes the moving picture data according to the MPEG-4 AVC/H.264 compression-coding standard, and the image coding apparatus may further include a parameter setting unit configured to set the offset value in the Implicit mode or the Explicit mode.

Furthermore, the parameter setting unit may set the offset value based on an amount of change in an average luminance value of the current image to be coded and an average luminance value of the reference image.

Furthermore, the present invention may also be implemented as a camera, and the camera according to the present invention is a camera including: an optical system which images light from a subject to form the subject image; an imaging device which captures the subject image to obtain the moving picture data; an imaging information generating unit which generates imaging information indicating an operation of the camera; an accumulating unit which accumulates a reference image; a predicted image generating unit which generates a predicted image of the current image to be coded, based on the reference image accumulated in the accumulating unit, by performing motion compensation with weighted prediction or motion compensation without the weighted prediction, the weighted prediction being a process of adding a predetermined offset value to a pixel value of the reference image; a coding unit which codes a difference between the predicted image generated by the predicted image generating unit and the current image to be coded; and a determining unit which determines whether or not the current image to be coded is included in, among the moving picture data, a picture group which is a group of successive pictures and indicates motion equal to or larger than a predetermined amount of motion, in which the predicted image generating unit generates the predicted image by performing the motion compensation without the weighted prediction when the determining unit determines that the current image to be coded is included in the picture group, and to generate the predicted image by performing the motion compensation with the weighted prediction when it is determined that the current image to be coded is not included in the picture group.

Note that the present invention can be implemented, not only as an image coding apparatus and a camera, but also as a method having the processing units configuring the image coding apparatus as steps.

Furthermore, a part of, or all of the components configuring the image coding apparatus and the camera may be configured with a system Large Scale Integration (LSI). The system LSI is a super multi-function LSI manufactured by integrating multiple components into one chip. More specifically, it is a computer system configured with the microprocessor, ROM and Random Access Memory (RAM).

According to the present invention, it is possible to improve the image quality and the coding efficiency while reducing the computation amount, and accelerating the process, and reducing the consumption electricity in the image compression-coding process.

Further Information about Technical Background to This Application

The disclosure of Japanese Patent Application No. 2008-194471 filed on Jul. 29, 2008 and Japanese Patent Application No. 2009-173752 filed on Jul. 24, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following describes the image coding apparatus and the image coding method according to the present invention based on the embodiments and with reference to the drawings.

(First Embodiment)

The image coding apparatus according to the first embodiment includes: a determining unit which determines whether or not the current image to be coded is included in, among the moving picture data, a picture group which is a group of successive pictures and indicates motion equal to or larger than a predetermined amount of motion; and a predicted image generating unit which generates a predicted image by performing motion compensation without weighted prediction when it is determined that the current image to be coded is included in the picture group or motion compensation with the weighted prediction when it is determined that the current image to be coded is not included in the picture group.

Figure 1:
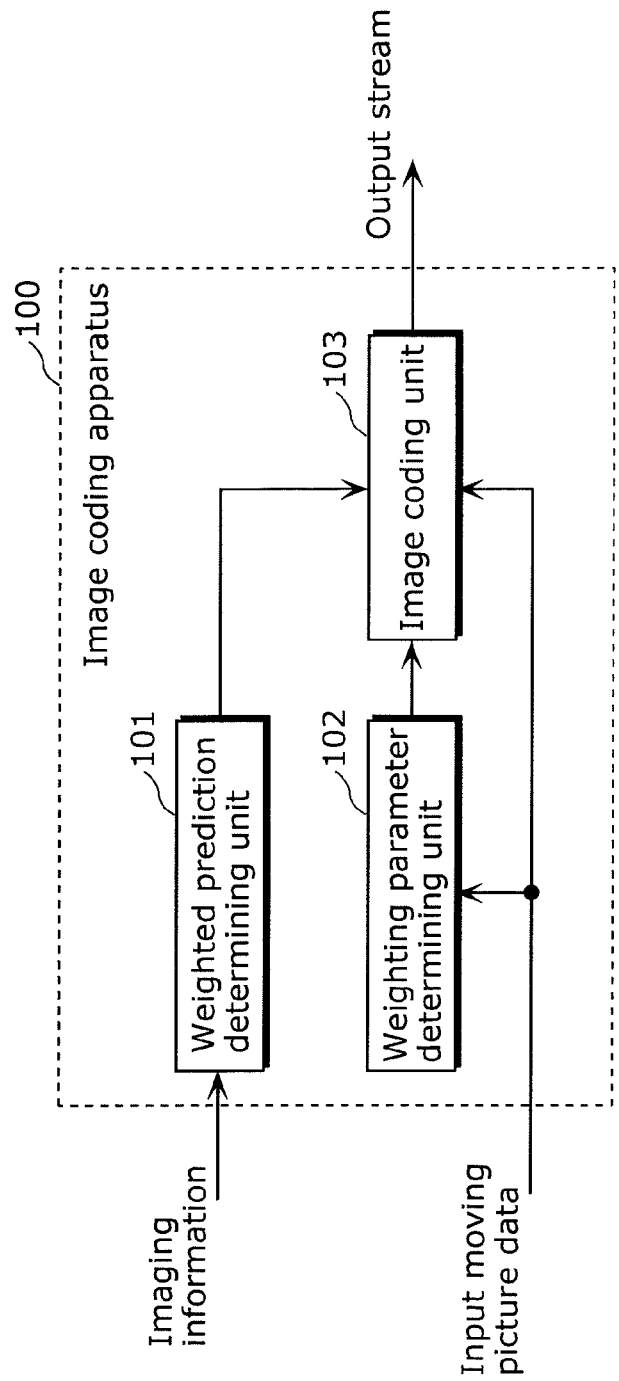
FIG. 1 is a block diagram showing an example of the structure of the image coding apparatus according to the first embodiment.

FIG. 1 is a block diagram showing an example of the structure of an image coding apparatus 100 according to the first embodiment. As shown in FIG. 1 the input moving picture data which includes multiple pictures and imaging information which is additional information on the input moving picture data are inputted to the image coding apparatus 100. The image coding apparatus 100 codes the input moving picture data that has been input according to the H.264 compression-coding standard, and outputs the coded input moving picture data as an output stream.

Note that, in the coding according to the H.264 compression-coding standard, one picture is divided into one or more slices, and the slice is used as a unit for processing. In the coding according to the H.264 compression-coding standard in the first embodiment, it is assumed that one picture is one slice. The same applies to the second and third embodiments to be described later.

As shown in FIG. 1, the image coding apparatus 100 includes a weighted prediction determining unit 101, a weighting parameter determining unit 102, and an image coding unit 103.

The weighted prediction determining unit 101 obtains imaging information as additional information on the input moving picture data, and generates weighted prediction flag information based on the obtained imaging information. The generated weighted prediction flag information is output to the image coding unit 103.

Note that, the imaging information is information indicating operations of the imaging apparatus such as a camera which obtained the input moving picture data through capturing. The operations of the imaging apparatus include motions of the imaging apparatus itself such as pan and tilt, and the operations inside the imaging apparatus such as zoom and a change in aperture. More specifically, the imaging information is information which indicates whether or not the imaging apparatus is zooming, information which indicates whether or not the imaging apparatus is panning, and information which indicates whether or not the imaging apparatus is tilting. Note that, the imaging information is the additional information regarding the input moving picture data that is input to the image coding apparatus 100 together with the input moving picture data.

The weighting parameter determining unit 102 determines, based on the pixel information of the input moving picture data, a coding parameter necessary for coding using weighted prediction. The information on the parameter that has been determined is output to the image coding unit 103 as the weighting parameter. Note that, the weighted prediction is a process of adding the predetermined offset value "o" to the pixel value of the reference image. Note that the offset value "o" may be added after multiplying the pixel value of the reference image by the weighting value "w".

The coding parameters are, for example, the weighting value "w" and the offset value "o". As described above, the weighting value "w" is a value multiplied by the pixel value of the reference picture, and the offset value "o" is a value added to the reference picture. For example, in the H.264, a current picture to be coded can refer to multiple reference pictures. For this reason, the weighting parameter determining unit 102 sets the offset value "o" for each reference picture to which the current picture to be coded refers.

The image coding unit 103 compression-codes the input moving picture data including the current picture to be coded through the coding in accordance with the H.264 compression-coding standard, according to the weighted prediction flag information generated by the weighted prediction determining unit 101 and the weighting parameter determined by the weighting parameter determining unit 102. The image coding unit 103 codes the difference between the predicted image and the current image to be coded, which is to be described later.

Figure 2:
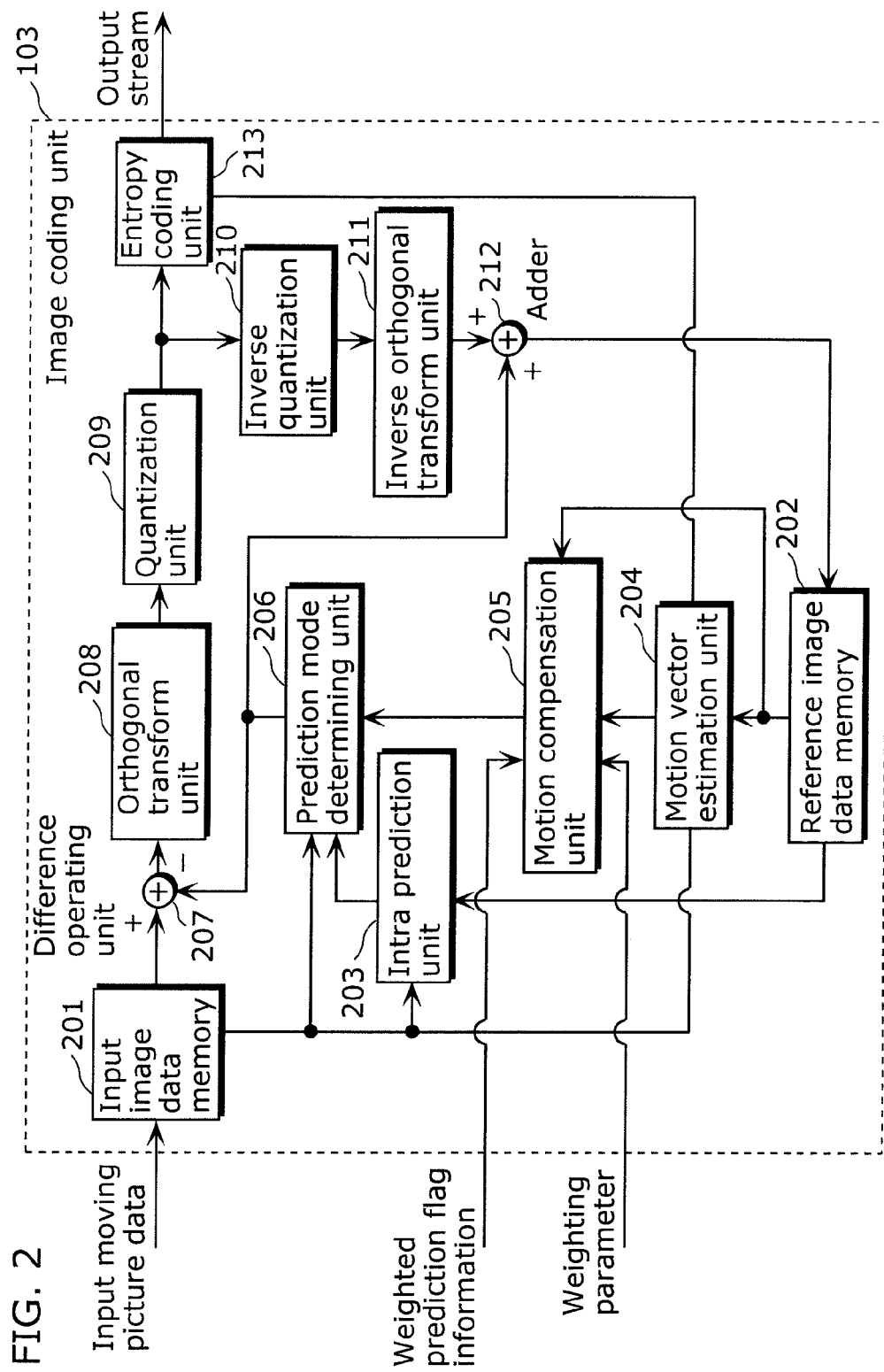
FIG. 2 is a block diagram showing an example of the structure of the image coding unit in the image coding apparatus according to the first embodiment.

Next, an example of the detailed structure of the image coding unit 103 is described with reference to FIG. 2. Note that, FIG. 2 is a block diagram showing an example of the detailed structure of the image coding unit 103 in the image coding apparatus 100 according to the first embodiment. It should be noted that the image coding unit 103 compression-codes the current picture to be coded included in the input moving picture data per block.

As shown in FIG. 2, the image coding unit 103 includes an input image data memory 201, a reference image data memory 202, an intra prediction unit 203, a motion vector estimation unit 204, a motion compensation unit 205, a prediction mode determining unit 206, a difference operating unit 207, an orthogonal transform unit 208, a quantization unit 209, an inverse quantization unit 210, an inverse orthogonal transform unit 211, an adder 212, and an entropy coding unit 213.

The input image data memory 201 is a memory in which the input moving picture data is stored. The intra prediction unit 203, the motion vector estimation unit 204, the prediction mode determining unit 206, and the difference operating unit 207 refer to the information held by the input image data memory 201.

The reference image data memory 202 is an example of accumulating unit such as a memory which accumulates reference images, and accumulates locally decoded images generated by the adder 212 as the reference images.

The intra prediction unit 203 generates an intra-predicted image by performing intra prediction using the coded pixels in the same frame in the locally-decoded image (reference image) stored in the reference image data memory 202. The predicted image that has been generated is output to the prediction mode determining unit 206.

The motion vector estimation unit 204 searches the locally-decoded images (reference images) stored in the reference image data memory 202, detects an image area closest to the input image, and determines the motion vector indicating the detected position. Subsequently, the motion vector estimation unit 204 determines the size of the current block to be coded with the smallest error and the motion vector in that size, and transmits the information indicating the determined size and the motion vector to the motion compensation unit 205 and the entropy coding unit 213.

Note that, the motion vector estimation unit 204 compares the current block to be coded (macroblock) with the block in any position in the reference picture, and determines the position of the most similar block as the motion vector. Relative error between the current block to be coded and the reference block is generally used for determining whether or not the blocks are similar, and particularly, summed absolute difference (SAD) is frequently used. It should be noted that searching for a reference block in the entire reference picture causes tremendous computation amount, and thus a range where a search is performed in the reference picture (search range) is narrowed down, and the search is performed within the narrowed-down range.

The motion compensation unit 205 is an example of the predicted image generating unit which generates the predicted image of the current picture to be coded by performing the motion compensation with the weighted prediction or the motion compensation without the motion compensation based on the reference image accumulated in the reference image data memory 202. For example, the motion compensation unit 205 extracts an area of the image most suitable for the predicted image from the locally decoded images (reference image) stored in the reference image data memory 202 using the motion vector included in the information received from the motion vector estimation unit 204, generates a predicted image for inter prediction, and outputs the generated predicted image to the prediction mode determining unit 206. The specific operations performed by the motion compensation unit 205 will be described later.

The prediction mode determining unit 206 determines the prediction mode, and selects, based on the result of determination, either the predicted image which is generated through the intra prediction from the intra prediction unit 203, or the predicted image which is generated by the inter prediction from the motion compensation unit 205. The predicted image that has been selected is output to the difference operating unit 207 and the adder 212. Note that, a method for determining the prediction mode performed by the prediction mode determining unit 206 includes, for example, calculating the SAD of the pixels between the input image and the predicted image both for the inter prediction and the intra prediction, and determining the prediction mode having a smaller calculated SAD to be the prediction mode.

The difference operating unit 207 reads the input image data to be coded from the input image data memory 201, and calculates the pixel difference value between the input image that has been read and the predicted image output from the prediction mode determining unit 206. The calculated pixel difference value is output to the orthogonal transform unit 208.

The orthogonal transform unit 208 transforms the pixel difference value input from the difference operating unit 207 into a frequency coefficient, and outputs the transformed frequency coefficient to the quantization unit 209. For example, the orthogonal transform unit 208 performs orthogonal transform such as Discrete Cosine Transform (DCT) on the pixel difference value.

The quantization unit 209 quantizes the frequency coefficient input from the orthogonal transform unit 208, and outputs the quantized value obtained by the quantization to the entropy coding unit 213 and the inverse quantization unit 210 as the coded data.

The inverse quantization unit 210 performs inverse quantization on the quantized value input from the quantization unit 209 to restore the frequency coefficient. The inverse quantization unit 210 outputs the restored frequency coefficient to the inverse orthogonal transform unit 211.

The inverse orthogonal transform unit 211 restores the pixel difference value by performing inverse frequency transformation on the frequency coefficient input from the inverse quantization unit 210. The inverse orthogonal transform unit 211 outputs the restored pixel difference value to the adder 212.

The adder 212 generates a locally decoded image by adding the pixel difference value input from the inverse orthogonal transform unit 211 and the predicted image output from the prediction mode determining unit 206. The generated locally decoded image is stored in the reference image data memory 202 as the reference image.

Here, the locally decoded images (reference image) stored on the reference image data memory 202 is basically the same image as the input image stored in the input image data memory 201. However, the locally decoded images include distortion component such as quantization distortion. This is because the locally decoded images are generated after the orthogonal transform by the orthogonal transform unit 208 and the quantization by the quantization unit 209, followed by the inverse quantization by the inverse quantization unit 210 and the inverse orthogonal transform by the inverse orthogonal transform unit 211.

The entropy coding unit 213 performs entropy coding on the quantized value input from the quantization unit 209 and the motion vector input from the motion vector estimation unit 204, and outputs the coded data as the output stream.

Figure 3:
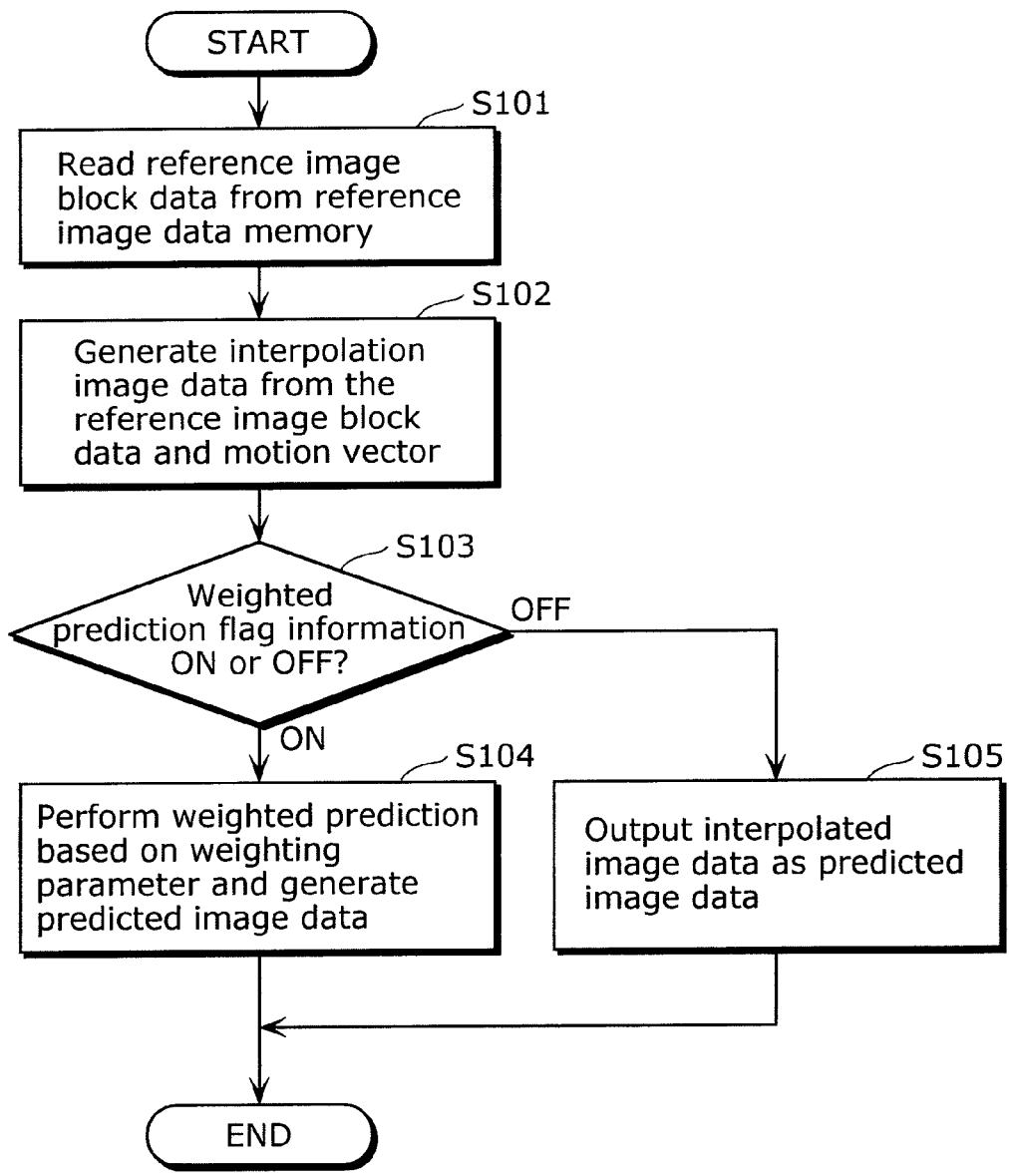
FIG. 3 is a flowchart showing an example of the process performed by the motion compensation unit in the image coding unit in the image coding apparatus according to the first embodiment.

Next, process flow of the motion compensation unit 205 in the image coding unit 103 in the image coding apparatus 100 according to the first embodiment is described, using FIG. 3 and with reference to FIGS. 1 and 2. Note that, FIG. 3 is a flowchart showing an example of process flow performed by the motion compensation unit 205 in the image coding unit 103 in the image coding apparatus 100. Note that, FIG. 3 is also a flowchart showing an example of the process performed by the motion compensation unit in the image coding unit in the image coding apparatus according to the second and third embodiments which will be described later.

As shown in FIG. 3, the motion compensation unit 205 reads the image area corresponding to the position indicated by the motion vector received from the motion vector estimation unit 204 from the locally decoded images (reference images) stored in the reference image data memory 202 (S105).

Next, the motion compensation unit 205 generates interpolated image data from the reference image block data and the motion vector received from the motion vector estimation unit 204 by performing interpolation at quarter-pel precision. The standard specifies the interpolation at quarter-pel precision, and interpolation using FIR (Finite Impulse Response) filter according to the value of motion vector.

Note that, in H.264, filtering is not performed when the motion vector indicates a position at integer-pel precision. Alternatively, when the motion vector indicates a position at half-pel precision, interpolation using a 6-tap filter is performed. Alternatively, when the motion vector indicates a position at quarter-pel precision, interpolation using a 6-tap filter and a 2-tap filter is performed.

The motion compensation unit 205 subsequently determines whether the weighted prediction flag information received from the weighted prediction determining unit 101 is ON or OFF (S103). When it is determined that the weighted prediction flag information is OFF ("OFF" in S103), the motion compensation unit 205 outputs, to the prediction mode determining unit 206, the generated interpolated image data as the predicted image data (S105).

When it is determined that the weighted prediction flag is ON ("ON" in S103), the motion compensation unit 205 generates the predicted image data by performing weighted prediction on the interpolated image data based on the weighting parameter determined by the weighting parameter determining unit 102 (S104).

Note that, the weighting parameter determined by the weighting parameter determining unit 102 is used as the weighting parameter when performing the weighted prediction on the interpolated image data in the Explicit mode. When the weighted prediction is performed in the Implicit mode, the weighting parameter is determined according to the procedure specified by the standard. Note that, in the H.264, when performing the weighted prediction in the Implicit mode, the weighting value "w" is calculated from a temporal distance between the input image data to be coded and the reference image data, and the offset value "o" is set at 0.

The following describes an example of the process performed by the image coding apparatus 100 provided with the image coding unit 103 configured as described above.

First, the input moving picture data is input to the weighting parameter determining unit 102 and the image coding unit 103, and the imaging information is input to the weighted prediction determining unit 101. The input moving picture data includes multiple pictures, and the pictures are stored in the input image data memory 201 in the image coding unit 103. One frame (picture) of the moving picture is composed of, for example, 1920 pixels×1080 pixels.

As described above, the imaging information is information indicating the operations of the camera that captured the input image data, and is additional information regarding the input image data, such as the information indicating whether the camera was panning, tilting, or zooming when the input image data was captured. The imaging information is, for example, information output from the sensor (such as an acceleration sensor) or from a controller and others included in the camera.

The weighted prediction determining unit 101 determines whether or not the weighted prediction is used when coding the current picture to be coded, by determining whether or not the current picture to be coded included in the input moving image data is an image included in a picture group which is a group of successive pictures and indicates motion equal to or higher than the predetermined amount of motion. Note that, in the following description, "the current picture to be coded is an image with motion" represents "the current picture to be coded is an image included in the picture group which is a group of successive pictures and indicates motion equal to or higher than the predetermined amount of motion".

The weighted prediction determining unit 101 determines that the weighted prediction is not used when it determines that the current picture to be coded is an image with motion, and sets the weighted prediction flag information to OFF. On the other hand, when it is determined that the current picture to be coded is not an image with motion, the weighted prediction determining unit 101 determines that the weighted prediction is used, and sets the weighted prediction flag information to ON.

More specifically, the weighted prediction determining unit 101 obtains the imaging information, and determines whether or not the weighted prediction is used for coding the current picture to be coded based on the imaging information that has been obtained. Subsequently, the weighted prediction determining unit 101 sets the weighted prediction flag information to ON or OFF depending on the result of determination, and outputs, to the image coding unit 103, the weighted prediction flag information that has been set.

Figure 4:
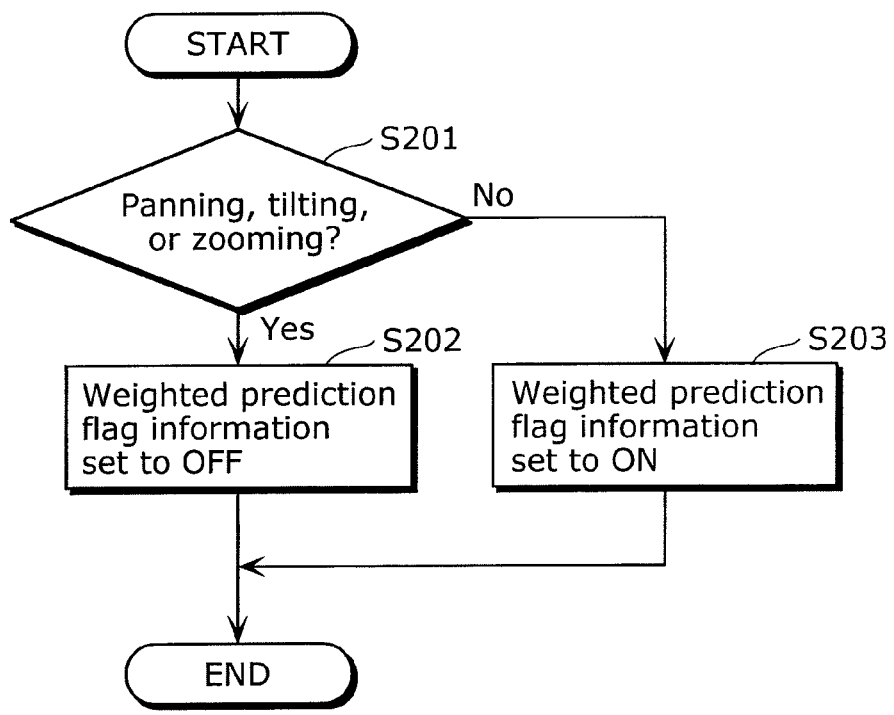
FIG. 4 is a flowchart showing an example of the process performed by the weighted prediction determining unit in the image coding apparatus according to the first embodiment.

The following is description for an example of the process performed by the weighted prediction determining unit 101 with reference to FIG. 4. Note that, FIG. 4 is a flowchart showing an example of the process performed by the weighted prediction determining unit 101 in the image coding apparatus 100 according to the first embodiment.

As shown in FIG. 4, the weighted prediction determining unit 101 determines whether or not the camera was panning, tilting, or zooming, when the current picture to be coded was captured (S201). When it is determined that the camera was panning, tilting, or zooming (Yes in S201), the weighted prediction determining unit 101 sets the weighted prediction flag information to OFF, and outputs, to the image coding unit 103, the weighted prediction flag information that has been set (S202).

When it is determined that the camera was not panning, tilting, or zooming (No in S101), the weighted prediction determining unit 101 sets the weighted prediction flag information to ON, and outputs, to the image coding unit 103, the weighted flag information that has been set (S203).

The weighting parameter determining unit 102 determines the coding parameter necessary for the coding using the weighted prediction based on the pixel information of the current picture to be coded, and outputs the coding parameter that has been determined to the image coding unit 103 as the weighting parameter. As a method for determining the weighting parameter, there is a method, for example, setting the weighting value "w" at 1 and the difference value between the average luminance values of the current picture to be coded and the average luminance values of the reference image to the offset value "o". However, the method is not limited to this example, and other methods may be employed. Note that, the weighting parameter is determined per picture, for example.

The image coding unit 103 performs a series of coding process such as motion vector estimation, motion compensation, intra prediction, orthogonal transform, quantization and entropy coding, based on the weighted prediction flag information generated by the weighted prediction determining unit 101 and the weighting parameter determined by the weighting parameter determining unit 102. More specifically, the motion compensation unit 205 generates the predicted image by performing only the motion compensation or by performing both the weighted prediction and motion compensation based on the weighted prediction flag information and the weighting parameter.

Here, when performing the weighted prediction in the Explicit mode, the motion compensation unit 205 performs the weighted prediction in the Explicit mode if the weighted prediction flag information is ON, and uses the weighting parameter determined by the weighting parameter determining unit 102 as the parameter necessary for coding using the weighted prediction. Here, when the weighted prediction flag information is OFF, the motion compensation without the weighted prediction is performed.

Alternatively, when performing the weighted prediction in the Implicit mode, the motion compensation unit 205 performs the weighted prediction in the Implicit mode if the weighted prediction flag information is ON, and performs motion compensation without weighted prediction if the weighted prediction flag information is OFF.

Note that, in the image coding apparatus 100 according to the first embodiment, the image coding unit 103 compression-codes the input moving picture data according to the H.264 compression-coding standard. The same applies to the second and third embodiments to be described later.

The weighted prediction does improve the coding efficiency of images where the luminance in the entire frame is changing such as a fading scene. However, it could also decrease the coding efficiency in a scene with large motion. Using the imaging information which indicates whether the camera was panning, tilting, or zooming when the current picture to be coded was captured allows determining whether or not the current picture to be coded is with motion. This improves the coding efficiency.

As described above, the weighted prediction flag is determined based on the imaging information. The current input image to be coded is coded using the weighted prediction when the weighted prediction flag information is ON, and the input image data to be coded is coded without using the weighted prediction when the weighted prediction flag information is OFF. More specifically, when it is determined that the current image to be coded is an image with motion, the predicted image is generated by performing the motion compensation without weighted prediction, and when it is determined that the current image to be coded is an image without motion, the predicted image is generated by performing the motion compensation with weighted prediction. This improves prediction precision of motion compensation, and thereby increasing the coding efficiency.

Furthermore, merely detecting the change in the luminance values as disclosed in Patent Reference 1 leads to a determination that the image with large motion is high in the change of luminance value, resulting in the weighted prediction on the image with large motion. This decreases the prediction precision, and the image quality and coding efficiency decreases as a result. Therefore, not performing the weighted prediction on the image with large motion improves the coding efficiency.

On the other hand, the image coding apparatus 100 according to the first embodiment determines whether the current picture to be coded is an image with motion based on the imaging information instead of the change in the luminance values, and does not perform the weighted prediction when the current picture to be coded is an image with motion. With this, according to the image coding apparatus according to the first embodiment can improve the coding efficiency.

Furthermore, the image coding apparatus can reduce the circuit size and the computation amount compared to the conventional method which is capable of performing two different types of motion compensation, that is, the motion compensation without the weighted prediction and the motion compensation with the weighted prediction, and which selects the most suitable type for each macroblock.

As described above, the image coding apparatus 100 according to the first embodiment achieves improvement in the image quality and the coding efficiency while reducing the computation amount and accelerating the process, and lowering consumption electricity in the image coding method.

Figure 5:
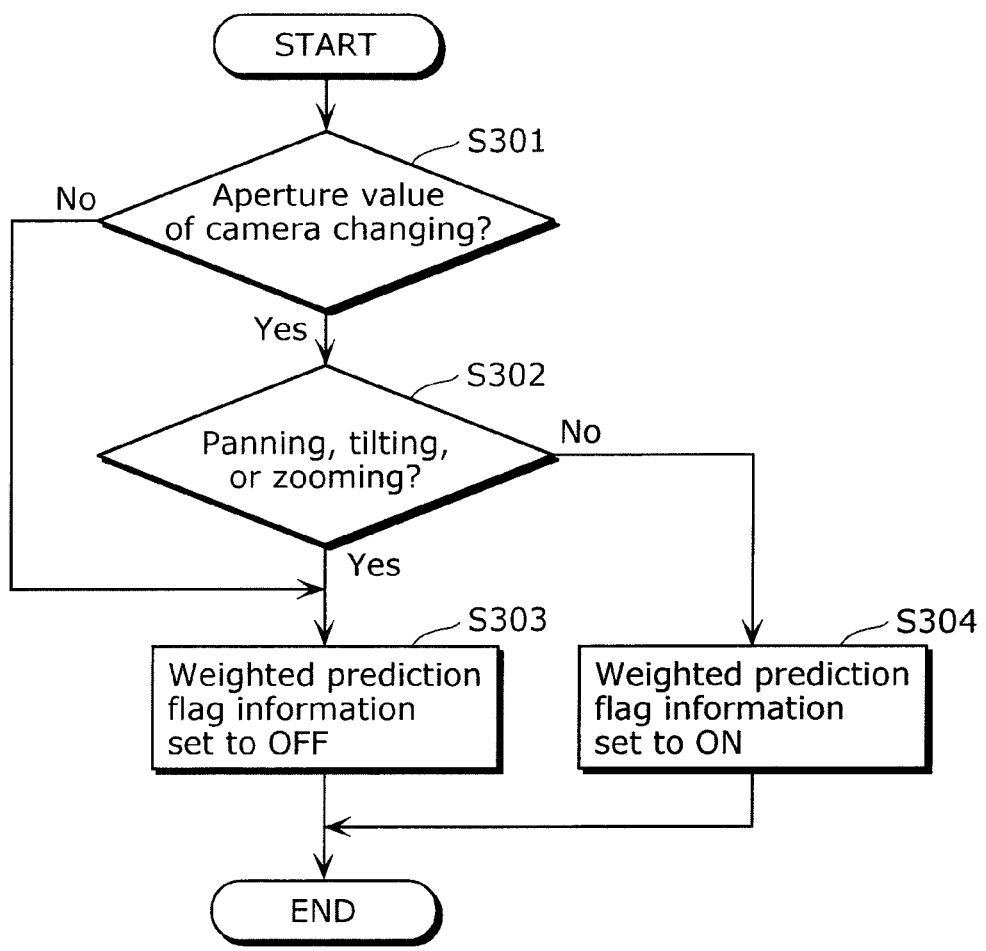
FIG. 5 is a flowchart showing another example of the process performed by the weighted prediction determining unit in the image coding apparatus according to the first embodiment.

Note that when setting the weighted prediction flag information to ON or OFF, the change in luminance value of the image may also be used, in addition to whether or not the image is with motion. For example, the imaging information may include information indicating whether the camera is changing the aperture or not. FIG. 5 is a flowchart showing another example of the process performed by the weighted prediction determining unit 101 in the image coding apparatus 100 according to the first embodiment.

As shown in FIG. 5, the weighted prediction determining unit 101 determines whether or not the camera was changing the aperture when the current picture to be coded was captured (S301). When it is determined that the camera was not changing the aperture (No in S301), the weighted prediction determining unit 101 sets the weighted prediction flag information to OFF (S303). This is because, no change in aperture indicates that there is not significant change in the luminance value of the current picture to be coded. This means it is not expected for the weighted prediction to be fully effective.

When it is determined that the camera was changing the aperture (Yes in S301), the weighted prediction determining unit 101 determines whether or not the camera was panning, tilting, or zooming when the current picture to be coded was captured (S302). When it is determined that the camera was panning, tilting, or zooming (Yes in S301), the weighted prediction determining unit 101 sets the weighted prediction flag information to OFF, and outputs, to the image coding unit 103 the weighted prediction flag information that has been set (S303).

When it is determined that the camera was not panning, tilting, or zooming (No in S302), the weighted prediction determining unit 101 sets the weighted prediction flag information to ON, and outputs, to the image coding unit 103, the weighted flag information that has been set (S304).

As described above, it is possible to select whether or not the weighted prediction is performed by determining whether or not there is motion, even when the aperture of the camera is changing.

This reduces the process amount compared to the case where only whether there is motion or not is determined, since there would less process amount in the case where the change in aperture is determined than in the case where whether there is motion or not is determined.

(Second Embodiment)

The image coding apparatus according to the second embodiment determines that the current image to be coded an image with motion when a characteristic amount calculated based on the current image to be coded and a previous image that is to be coded is equal to or larger than a predetermined threshold, and determines that the current image to be coded is not with motion when the characteristic amount is smaller than the threshold. As described above, the image coding apparatus according to the second embodiment determines whether or not the current image to be coded is with motion to select whether or not the weighted prediction is performed based on the determination result.

Figure 6:
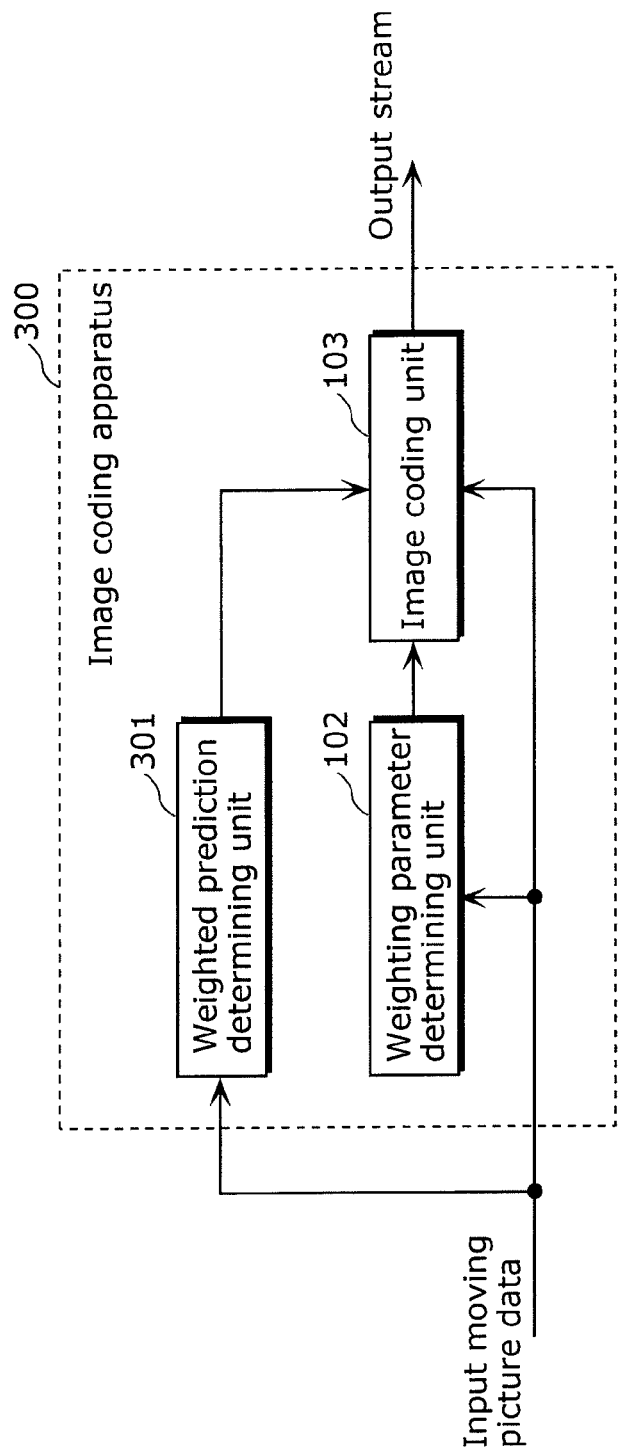
FIG. 6 is a block diagram showing an example of the structure of the image coding apparatus according to the second embodiment.

FIG. 6 is a block diagram showing an example of the structure of an image coding apparatus 300 according to the second embodiment.

As shown in FIG. 6, the image coding apparatus 300 includes a weighted prediction determining unit 301, the weighted parameter determining unit 102, and the image coding unit 103. Note that, the weighting parameter determining unit 102 and the image coding unit 103 are identical to the same described in the first embodiment. Accordingly, the same reference numerals are attached, and the description therefor shall be omitted below.

The weighted prediction determining unit 301 determines whether the characteristic amount calculated based on the current picture to be coded included in the input moving picture data that has been input and the previous picture that is to be coded is equal to or higher than the predetermined threshold. When it is determined that the characteristic amount is equal to or larger than the threshold, the weighted prediction determining unit 301 determines that the current picture to be coded is an image with motion, and sets the weighted prediction flag information to OFF. When it is determined that the characteristic amount is smaller than the threshold, the weighted prediction determining unit 301 determines that the current picture to be coded is not an image with motion, and sets the weighted prediction flag information to ON. As described above, the weighted prediction determining unit 301 generates the weighted prediction flag information using the pixel value information of the input moving picture data, and outputs the weighted prediction flag information that has been generated to the image coding unit 103.

Note that the characteristic amount is a value obtained from the current picture to be coded, and a value indicating motion of the image. For example, the characteristic amount is motion vector characteristic amount (hereinafter referred to as the preprocess motion vector characteristic amount) indicating motion between the current picture to be coded and the previous picture that is to be coded.

The following is a description of an example of process performed by the weighted prediction determining unit 301 in the image coding apparatus 300 which is configured as described above.

First, the input moving picture data including the current picture to be coded is input to the image coding unit 103, as well as the weighted prediction determining unit 301 and the weighting parameter determining unit 102. The weighted prediction determining unit 301 determines whether or not the weighted prediction is used for coding the current picture to be coded, from the pixel information of the current picture to be coded that has been input, based on a method to be described later. The weighted prediction determining unit 301 sets the weighted prediction flag information to ON when it is determined that the weighted prediction is used for coding the current picture to be coded, and sets the weighted prediction flag information to OFF in other cases, and outputs the weighted prediction flag information that has been set to the image coding unit 103.

Figure 7:
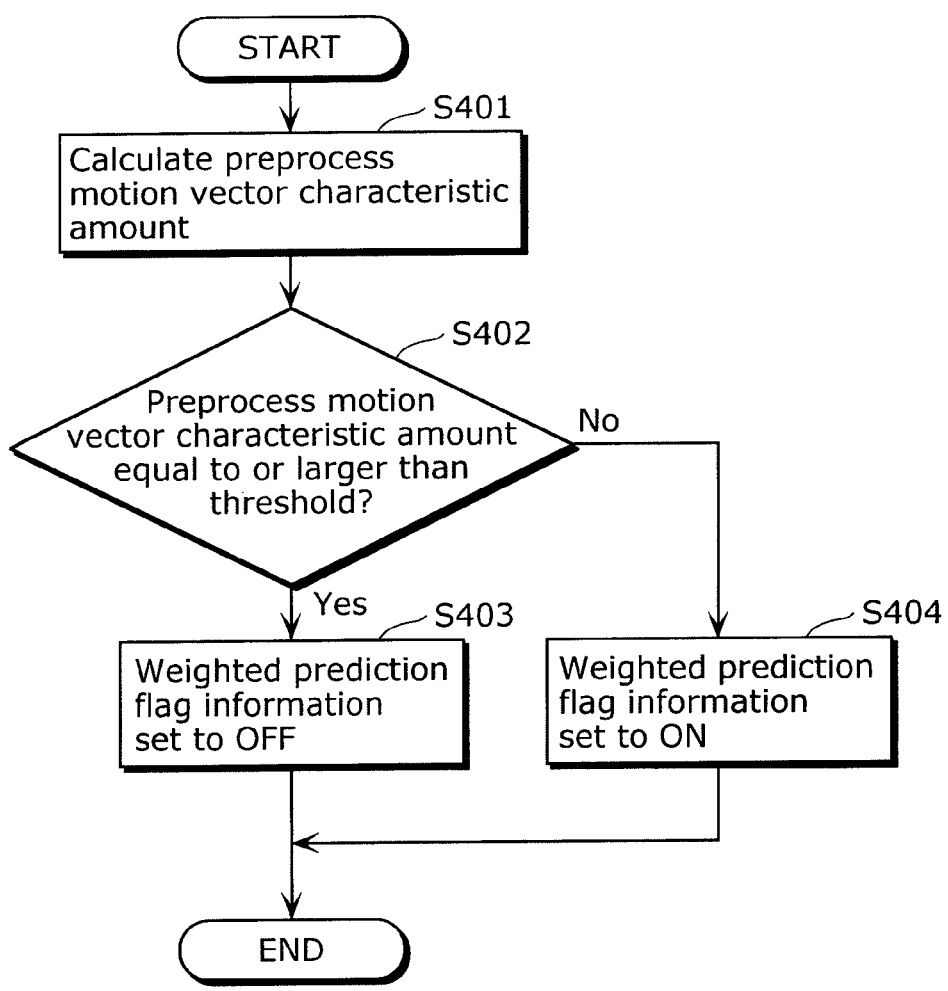
FIG. 7 is a flowchart showing an example of the process performed by the weighted prediction determining unit in the image coding apparatus according to the second embodiment.

The following is the description for an example of the process performed by the weighted prediction determining unit 301 with reference to FIG. 7. Note that, FIG. 7 is a flowchart showing an example of the process performed by the weighted prediction determining unit 301 in the image coding apparatus 300 according to the second embodiment.

As shown in FIG. 7, the weighted prediction determining unit 301 calculates preprocess motion vector characteristic amount using the current picture to be coded included in the input moving picture data and a previous picture that is to be coded (S401). Subsequently, the weighted prediction determining unit 301 determines whether or not the calculated preprocess motion vector characteristic amount is equal to or higher than the threshold (S402).

When the weighted prediction determining unit 301 determines that the preprocess motion vector characteristic amount is equal to or higher than the predetermined threshold (Yes in S402), the weighted prediction determining unit 301 sets the weighted prediction flag information to OFF, and outputs the weighted prediction flag information that has been set to the image coding unit 103 (S403). When the weighted prediction determining unit 301 determines that the preprocess motion vector characteristic amount is smaller than the predetermined threshold (No in S402), the weighted prediction determining unit 301 sets the weighted prediction flag information to ON, and outputs, to the image coding unit 103, the weighted prediction flag information that has been set (S404).

Here, the preprocess motion vector characteristic amount includes, for example, a sum of absolute values of X component and Y component of each vector calculated from the current input image (current picture to be coded) and a past input image (previous picture that is to be coded), and a size of motion vector such as the Euclidean norm which indicates a distance between two points.

Furthermore, the previous picture that is to be coded may be a previous picture that is to be coded corresponding to the reference picture used for coding the current picture to be coded. Alternatively, it may be a previous picture that is to be coded that has been input immediately before the current picture to be coded. However, it may not be limited to this description, and, for example, when a desired previous picture that is to be coded such as the pictures described above cannot be used due to circuit design and others, it may be substituted with the other previous picture that is to be coded input a few frames before the current picture to be coded.

Furthermore, the motion vector between the current picture to be coded and the previous picture that is to be coded is, for example, a representative value of the motion vectors obtained by performing motion vector estimation within a predetermined search range for the current reduced image and the previous reduced image which are obtained by reducing the current picture to be coded and the previous picture that is to be coded, respectively. Here, the representative value is an average value of the motion vectors, for example. However, the representative value may not be limited to this example, and may be determined using statistical processing and others.

As described above, in the image coding apparatus 300 according to the second embodiment, it is determined whether or not the weighted prediction is performed based on the input moving picture data including the current picture to be coded. This allows highly precise determination on whether the current picture to be coded is an image with motion, and thereby increasing the image quality and coding efficiency.

(Third Embodiment)

The image coding apparatus according to the third embodiment determines that the current image to be coded is an image with motion when a characteristic amount calculated based on a previously coded image is equal to or larger than a predetermined threshold, and determines that the current image to be coded is not an image with motion when the characteristic amount is smaller than the threshold. As described above, the image coding apparatus according to the third embodiment selects whether or not the weighted prediction is performed based on the determination result whether or not the previously coded image is with motion.

Figure 8:
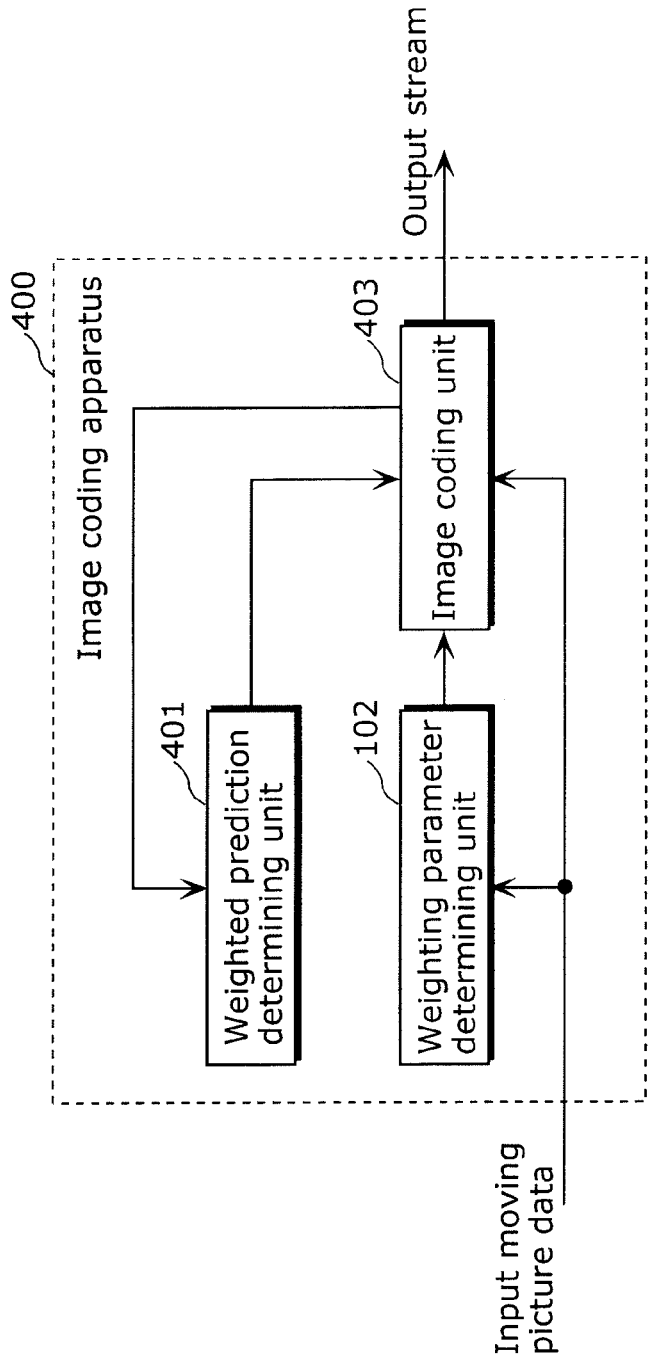
FIG. 8 is a block diagram showing an example of the structure of the image coding apparatus according to the third embodiment.

FIG. 8 is a block diagram showing an example of the structure of the image coding apparatus 400 according to the third embodiment.

As shown in FIG. 8, the image coding apparatus 400 includes a weighted prediction determining unit 401, the weighting parameter determining unit 102, and an image coding unit 403. The weighting parameter determining unit 102 is identical to the same described in the first embodiment, and thus the same reference numeral is attached. Accordingly, the description shall be omitted below.

The weighted prediction determining unit 401 determines whether the characteristic amount calculated based on the previously coded picture is equal to or higher than a predetermined threshold. When it is determined that the characteristic amount is equal to or higher than the threshold, the weighted prediction determining unit 401 determines that the current picture to be coded is an image with motion, and sets the weighted prediction flag information to OFF. When it is determined that the characteristic amount is smaller than the threshold, the weighted prediction determining unit 401 determines that the current picture to be coded is not an image with motion, and sets the weighted prediction flag information to ON. As described above, the weighted prediction determining unit 401 generates the weighted prediction flag information using the image coding information of the picture coded before the current input image data in the image coding unit 403, and outputs the weighted prediction flag information that has been generated to the image coding unit 403.

The image coding unit 403 performs the same process as the image coding unit 103 described in the first embodiment, and outputs the image coding information used for the compression-coding to the weighted prediction determining unit 401.

The following describes an example of the process performed by the image coding apparatus 400 configured as described above.

First, the input moving picture data including the current picture to be coded is input to the weighting parameter determining unit 102 and the image coding unit 403. As described in the first and second embodiments, the image coding unit 403 compression-codes the image data including the current picture to be coded according to the weighted prediction flag information output from the weighted prediction determining unit 401 and the weighted parameter output from the weighted parameter determining unit 102 in the coding in accordance with the H.264 compression-coding standard. The image coding unit 402 outputs compression-coded image data as an output stream. Furthermore, the image coding unit 403 outputs the image coding information which is information used for the compression-coding to the weighted prediction determining unit 401.

The weighted prediction determining unit 401 receives the image coding information output from the image coding unit 403, and determines, using the received image coding information, whether or not the weighted prediction is used for coding the current picture to be coded, by a method which will be described later. The weighted prediction determining unit 401 sets the weighted prediction flag to ON when it determines that the weighted prediction is used for coding the current picture to be coded, and in other cases, sets the weighted prediction flag information to OFF, and outputs, to the image coding unit 403, the weighted prediction flag information that has been set.

Note that, the image coding information is transmitted from the image coding unit 403 to the weighted prediction determining unit 401 in the description above. However, it may not be limited to this example, and the output stream including the image coding information may be transmitted. However, in this case, in the weighted prediction determining unit 401, it is necessary to incorporate a function for extracting the image coding information out of the output stream input from the image coding unit 403.

Figure 9:
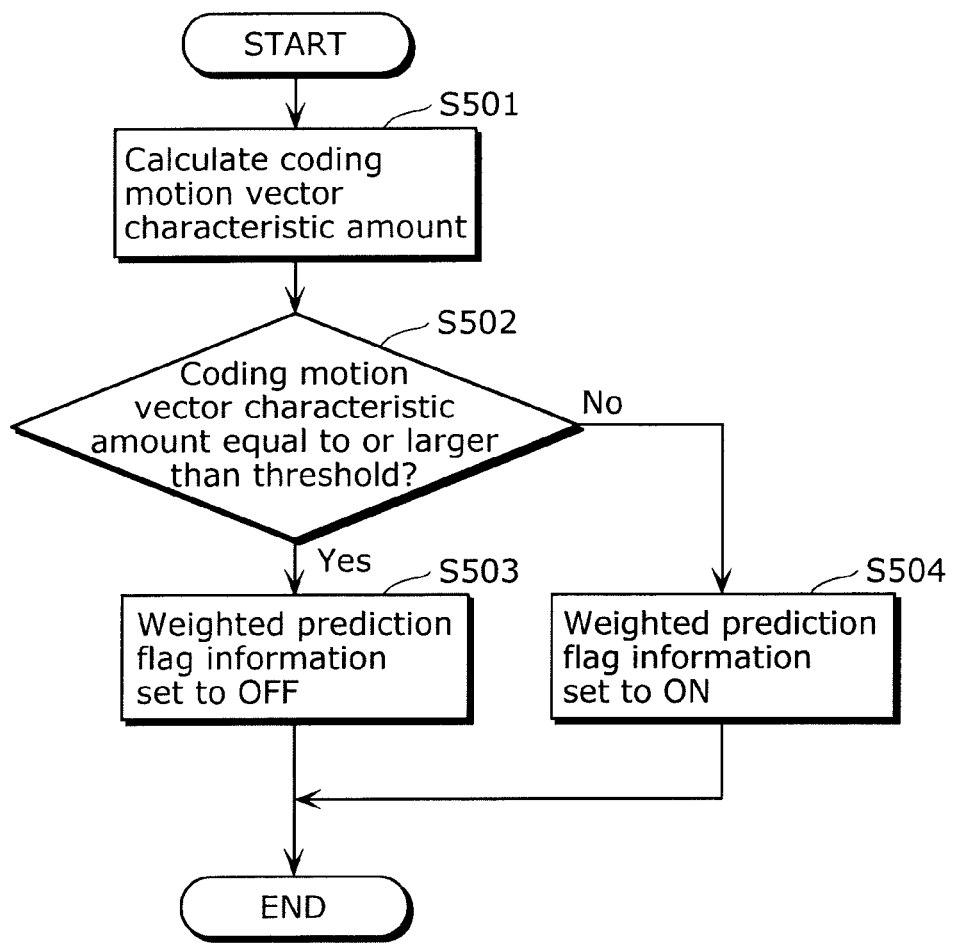
FIG. 9 is a flowchart showing an example of the process performed by the weighted prediction determining unit in the image coding apparatus according to the third embodiment.

The following is the description for an example of the process performed by the weighted prediction determining unit 401 with reference to FIG. 9. Note that, FIG. 9 is a flowchart showing an example of the process performed by the weighted prediction determining unit 401 in the image coding apparatus 400 according to the third embodiment.

As shown in FIG. 9, the weighted prediction determining unit 401 first calculates the coding motion vector characteristic amount from the image coding information of the picture that has been coded before the current picture to be coded in the image coding unit 403 (S501). Next, the weighted prediction determining unit 401 determines whether the coding motion vector characteristic amount is equal to or higher than a predetermined threshold (S502).

When the weighted prediction determining unit 401 determines that the coding motion vector characteristic amount is equal to or higher than a predetermined threshold (Yes in S502), the weighted prediction determining unit 401 sets the weighted prediction flag information to OFF, and outputs the weighted prediction flag information that has been determined to the image coding unit 403 (S503). Furthermore, when the weighted prediction determining unit 401 determines that the coding motion vector characteristic amount is smaller than a predetermined threshold (No in S502), the weighted prediction determining unit 401 sets the weighted prediction flag information to ON, and outputs the weighted prediction flag information that has been set to the image coding unit 403 (S504).

Here, the image coding information of the picture that has been coded and output before the current picture to be coded is, for example, the motion vector coded in each macroblock. However, it may not be limited to this example, and the parameter other than the motion vector may also be used.

Furthermore, an average value of the motion vectors belonging to the same picture is an example of the coding motion vector characteristic amount. However, it may not be limited to this example, and may be an average value of the absolute values of the motion vectors belonging to the same picture. Alternatively, it may also be a variance of motion vectors belonging to the same picture.

As described above, in the image coding apparatus 400 according to the third embodiment, it is determined whether or not the weighted prediction is performed based on the previously coded picture. More specifically, the image coding information used for coding the previous picture that is to be coded is used, and thus it is not necessary to newly calculate the characteristic amount as described in the second embodiment. This allows highly precise determination on whether or not the current picture to be coded is with motion at low process amount. This improves the image quality and the coding efficiency.

As described above, in the image coding apparatus 100, 300, or 400 according to the first to third embodiments, the weighted prediction determining unit 101, 301, or 401 generates the weighted prediction flag information based on the imaging information which is the additional information on the input moving picture data, the pixel information of the input moving picture data, or the image coding information of the compression-coded picture generated in the image coding unit 403 before the current picture to be coded, and outputs the generated weighted prediction flag information to the image coding unit 103 or 403.

Furthermore, the weighting parameter determining unit 102 determines the weighting parameter and outputs the weighting parameter to the image coding unit 103 or 403. Furthermore, the image coding unit 103 or 403 compression-codes the input moving picture data based on the weighted prediction flag information output from the weighted prediction determining unit 101, 301, or 401, and the weighting parameter output from the weighting parameter determining unit 102, and outputs the stream.

The image coding apparatus 100, 300, or 400 according to the first to third embodiments can improve the prediction precision of the motion compensation with the structure described above, and thereby improving the coding efficiency.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the three different methods are proposed as methods for determining whether or not the weighted prediction is used for compression-coding the input moving picture data. However, whether or not the weighted prediction is used may be determined by combining two or more of these methods.

Furthermore, in the first embodiment, the information whether or not the camera that captured the input moving picture data was panning, tilting, or zooming, and the information whether or not the aperture of the camera was changing were listed as the examples of the imaging information. However, the imaging information may not be limited to this example. For example, the imaging information may be the information indicating whether or not the sensitivity of the camera is changing, or the information indicating the other physical movement of the camera.

Furthermore, in the first to third embodiments, the case where the SAD is used as the error between the current block and the reference block upon the motion vector estimation is listed as the example. However, the formula for calculating the SAD, that is, $\Sigma|\text{pixel of current block} - \text{pixel of reference block}|$ may be modified, and $\Sigma|\text{pixel of current block} - \text{pixel}$ of reference block—offset value may be used as the error. In this case, the weighting parameter is used as the offset value when the weighted prediction flag information is ON and the offset value is set at 0 when the weighted prediction flag information is OFF.

Furthermore, in the first to third embodiments, the H.264 is used as the compression-coded method. However, the compression-coding method may not be limited to this, and the compression-coding method having the function equivalent to the weighted prediction may also be used.

Furthermore, when the input moving picture data is the interlaced moving picture data, the weighting parameter determining unit 102 may determine the weighting parameter based on the relationship of the parity of the reference picture and the current picture to be coded. Note that, when both the reference picture and the current picture to be coded are on the top field or the bottom field, it is referred to as the "same parity", and when one of the pictures is on the top field and the other is on the bottom field, it is referred to as the "opposite parity".

More specifically, the weighting parameter determining unit 102 sets the offset value "o" of the reference picture having the parity opposite from the parity of the current picture to be coded at 0, and determines the offset value "o" of the reference picture whose parity is same as the parity of the current picture to be coded based on the Explicit mode.

Figure 10:
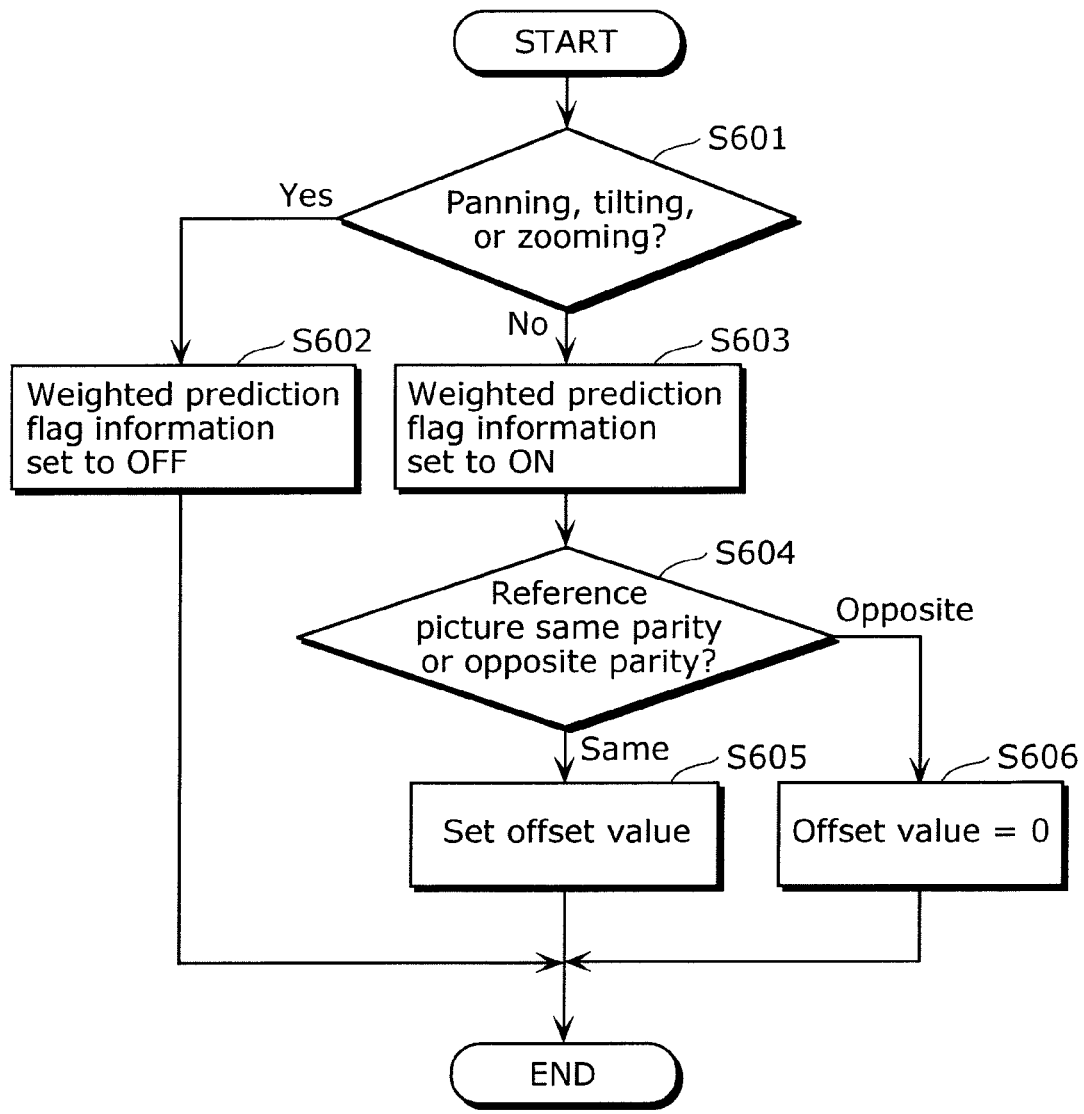
FIG. 10 is a flowchart showing an example of the process performed by the weighted prediction determining unit in the image coding apparatus, when the input image data is interlaced image data.

FIG. 10 is a flowchart showing an example of processing performed by the weighting parameter determining unit 102 in the image coding apparatus 100, when the input moving picture data is the interlaced image data.

As shown in FIG. 10, the weighted prediction determining unit 101 determines whether or not the camera was panning, tilting, or zooming, when the current picture to be coded was captured (S601). When it is determined that the camera was panning, tilting, or zooming (Yes in S601), the weighted prediction determining unit 101 sets the weighted prediction flag information to OFF, and outputs, to the image coding unit 103, the weighted prediction flag information that has been set (S602).

When it is determined that the camera was not panning, tilting, or zooming (No in S601), the weighted prediction determining unit 101 sets the weighted prediction flag information to ON, and outputs, to the image coding unit 103, the weighted flag information that has been set (S603).

The weighting parameter determining unit 102 determines, for each of the at least one reference picture to which the current picture to be coded refer, whether the reference picture has the same parity or opposite parity. When the reference picture has the same parity ("Same" in S604), the weighting parameter determining unit 102 sets the offset value "o" based on the Explicit mode (S605). When the reference picture has the opposite parity ("Opposite" in S605), the weighting parameter determining unit 102 sets the offset value "o" at 0 (S606).

With the process described above, when the input moving picture data is the interlaced image data, even if the weighted prediction flag information is set to ON based on the imaging information, setting the offset value "o" at 0 when the reference picture has the opposite parity prevents the weighted prediction from being performed.

This is because selecting the picture having the opposite parity as the reference picture generally indicates that the current picture to be coded is an image with large motion. More specifically, even when it is determined that there is no motion from the imaging information, determining the relationship of the parity allows more precise determination on whether or not the current picture to be coded is an image with motion. This improves the image quality and the coding efficiency.

Furthermore, the present invention can provide, not only the image coding apparatus including the processing units in the first to third embodiments, the image coding method including the processing units provided in the image coding apparatus as steps, the image coding integrated circuit including the processing units provided in the image coding apparatus, and the image coding program which can implement the image coding method.

Furthermore, the image coding program can be distributed through the recoding media such as the Compact Disc-Read Only Memory (CD-ROM), the Digital Versatile Disc-ROM (DVD-ROM), and Blu-ray Disc (BD) and via the communication network such as the Internet.

Figure 11:
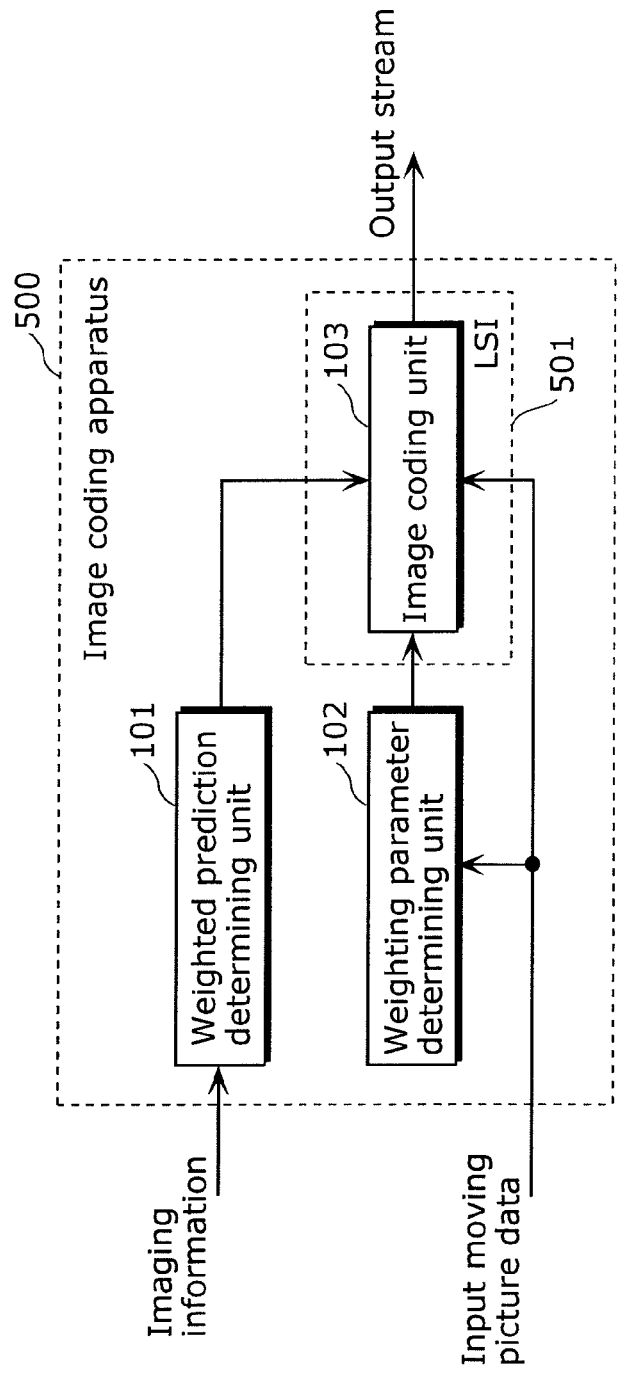
FIG. 11 is a block diagram showing an example of the structure of the image coding apparatus according to a variation of the embodiments of the present invention.

Furthermore, for example, the present invention may be implemented as the image coding integrated circuit which includes a part of, or all of the components provided in the image coding apparatus 100, 300, or 400 in the first to third embodiments. FIG. 11 is a block diagram showing an example of the structure of an image coding apparatus 500, according to a variation of the first to third embodiments of the present invention.

As shown in FIG. 11, the image coding apparatus 500 is implemented with an LSI 501 as the image coding unit 103. Note that, the weighted prediction determining unit 101 and the weighting parameter determining unit 102 may be implemented as the LSI 501.

The image coding integrated circuit can be implemented in the form of a typical integrated circuit, that is, an LSI. Each of these components can be multiple chips, or also can be one chip. For example, the functional blocks other than the memory may be configured with a one-chip LSI. Note that, the LSI is also referred to as an IC, a system LSI, a super LSI or an ultra LSI depending on the degree of integration.

Moreover, ways to achieve integration are not limited to the LSI; and a dedicated circuit or general purpose processor can be used for the integrated circuit as well. Field Programmable Gate Array (FPGA) which is programmable after the LSI is manufactured or a reconfigurable processor that allows reconfiguration of the connection or configuration of LSI may also be used.

Furthermore, when a new technology for integrated circuits which takes over LSI with the progress in the semiconductor technology and other derived technologies, the new technology may be used for integrating the functional blocks naturally. Application of biotechnology is one such possibility.

Furthermore, when integrating the circuit, a unit which stores the data may not be incorporated in the one-chip configuration, but may be configured separately.

Figure 12:
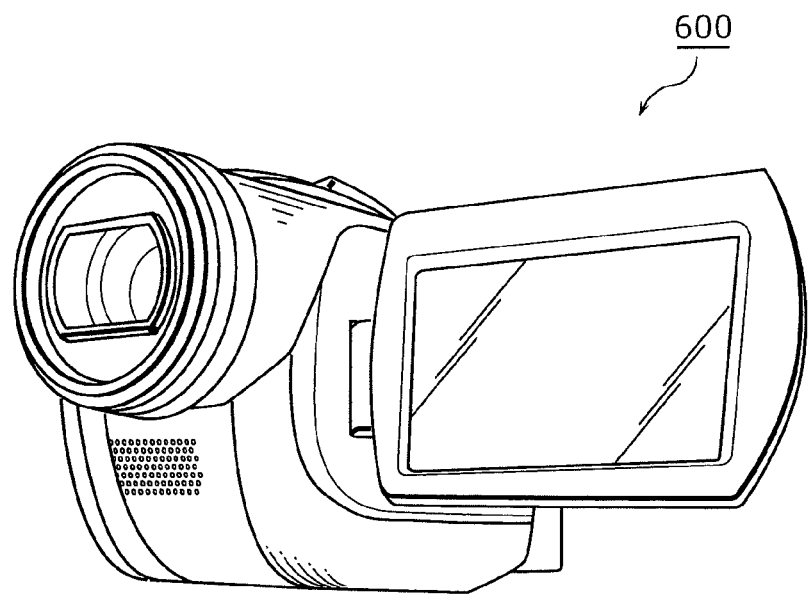
FIG. 12 is a schematic diagram showing an example of a camera according to the variation of the embodiments of the present invention.
Figure 13:
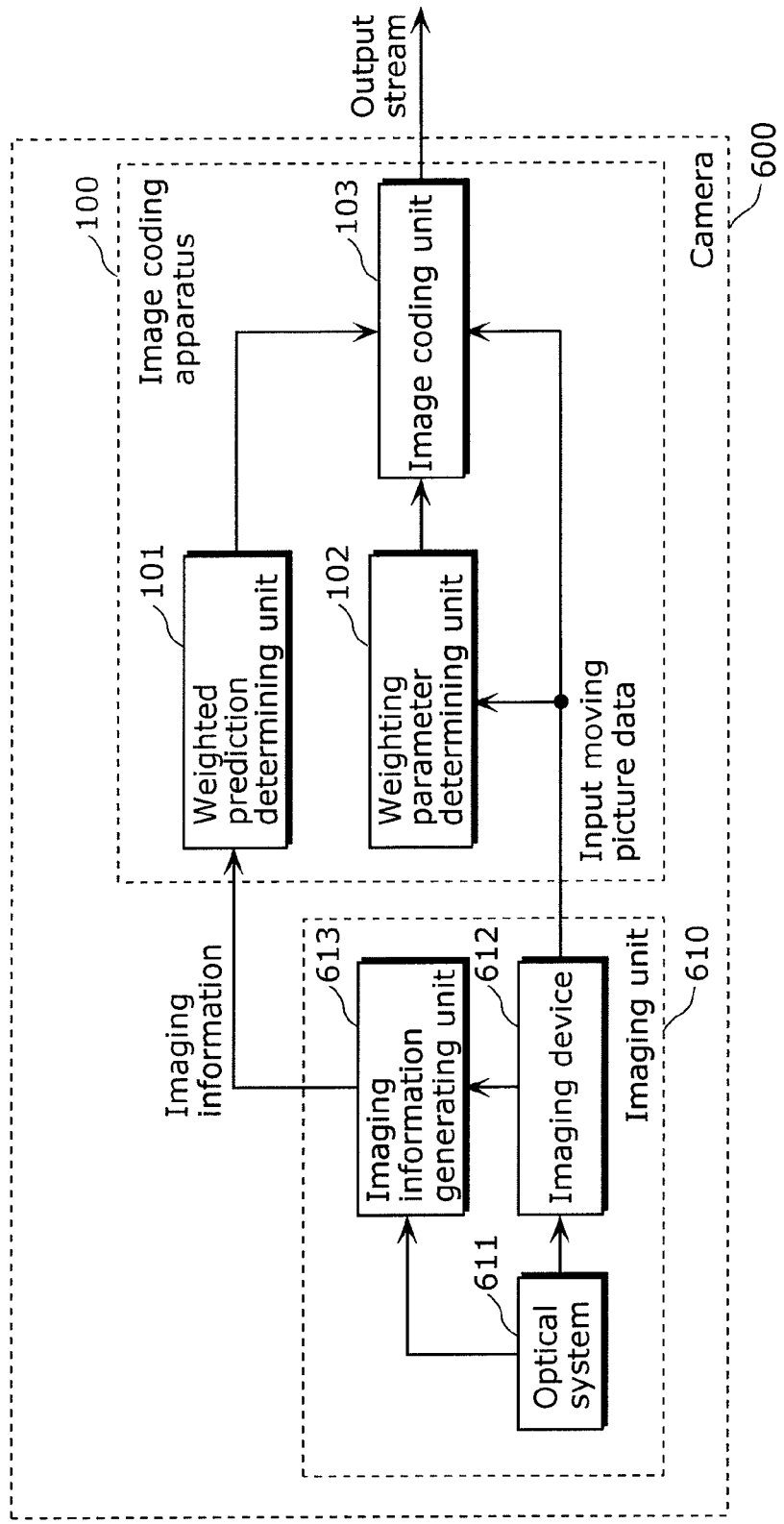
FIG. 13 is a block diagram showing an example of the structure of the camera according to a variation of the embodiments of the present invention.

Furthermore, the present invention may be implemented as a camera 600 shown in FIG. 12. Note that, FIG. 12 is a schematic diagram showing an example of the camera 600 in the variation of the first to third embodiments according to the present invention. The following describes an example structure of the camera 600 with reference to FIG. 13. FIG. 13 is a block diagram showing an example of the structure of the camera 600 according to a variation of the first to third embodiments of the present invention.

As shown in FIG. 13, the camera 600 is a camera which codes the moving picture data obtained through capturing the subject image and records the coded moving picture data on the recording medium. The camera 600 includes the image coding apparatus 100 and the imaging unit 610. The same reference numeral is attached to the image coding apparatus

100 since it is identical to the same described in the first embodiment. Accordingly, the description is omitted below.

The imaging unit 610 is a processing unit which captures the subject image, and includes an optical system 611, an imaging device 612, and an imaging information generating unit 613.

The optical system 611 is, for example, an optical lens which images light from a subject on the imaging device 612 to form the subject image. The optical system 611 can change the zoom or the aperture with the control by the control unit (not shown) included in the camera 600, for example.

The imaging device 612 is an image sensor which captures the subject image, and outputs the moving picture data obtained through the capturing to the weighting parameter determining unit 102 and the image coding unit 103 as the input moving picture data. The imaging device 612 can change the sensitivity with the control by the control unit (not shown), for example.

The imaging information generating unit 613 generates the imaging information indicating the operations of the camera 600, and outputs the generated imaging information to the weighted prediction determining unit 101. More specifically, the imaging information generating unit 613 determines the operation of the camera 600 itself using the acceleration sensor included in the camera 600, and determines whether the camera 600 is panning or tilting. Subsequently, the result of determination is output to the weighted prediction determining unit 101. Note that the acceleration sensor may be a sensor used for the image stabilization function of the camera 600, for example.

Furthermore, the imaging information generating unit 613 determines whether the zoom, aperture, or sensitivity is changing on the optical system 611 and the imaging device 612. Subsequently, the result of determination is output to the weighted prediction determining unit 101. Note that, the imaging information generating unit 613 may receive the information indicating whether the camera is zooming or not from the control unit (not shown).

With the structure described above, the camera 600 can code the moving picture data obtained by capturing with high image quality and at high coding efficiency, and record the coded moving picture data on the recording medium.

As described above, the image coding apparatus and camera according to the present invention can determine whether or not the weighted prediction is used for coding the input moving picture data using at least one of: the pixel information of the input moving picture data; the imaging information of the camera that captured the input moving picture data; and the image coding information of the picture that has been coded before the current picture to be coded. Since the motion compensation is performed based on the determination result, it is possible to improve the coding efficiency of the input moving picture data.

Furthermore, the image coding apparatus can perform two different types of motion compensation, that is, the motion compensation without the weighted prediction and the motion compensation with the weighted prediction. Thus, it is possible to reduce the circuit size and the computation amount compared to the conventional method which selects the most suitable type for each macroblock. Accordingly, it is possible to improve the image quality and the coding efficiency while reducing the computation amount, accelerating the process, and reducing the consumption electricity of the image coding apparatus.

Industrial Applicability

The image coding apparatus and the image coding method according to the present invention is effective for achieving the coding of the video according to the compression-coding method such as the H.264 with smaller circuit scale and lower consumption electricity. For example, the image coding apparatus and the image coding method are applicable to video cameras, personal computers, Hard Disk Drive (HDD) recorders, DVD recorders, and mobile phones with camera.

What is claimed is:

1. An image coding apparatus which compression-codes moving picture data including a current image to be coded, said image coding apparatus comprising:
   an accumulating unit configured to accumulate a reference image;
   a predicted image generating unit configured to generate a predicted image of the current image to be coded, based on the reference image accumulated in said accumulating unit, the predicted image being generated by performing motion compensation with weighted prediction or motion compensation without the weighted prediction, the weighted prediction being a process of adding a predetermined offset value to a pixel value of the reference image;
   a coding unit configured to code a difference between the predicted image generated by said predicted image generating unit and the current image to be coded; and
   a determining unit configured to determine whether or not the current image to be coded is included in, among the moving picture data, a picture group which (i) is a group of successive pictures and (ii) indicates motion equal to or larger than a predetermined amount of motion,
   wherein said predicted image generating unit is configured (i) to generate the predicted image by performing the motion compensation without the weighted prediction when a result of the determination by said determining unit indicates that the current image to be coded is included in, among the moving picture data, the picture group indicating the motion equal to or larger than the predetermined amount of motion, and (ii) to generate the predicted image by performing the motion compensation with the weighted prediction when the result of the determination by said determining unit indicates that the current image to be coded is not included in the picture group.

2. The image coding apparatus according to claim 1,
   wherein said determining unit is configured to obtain imaging information indicating whether or not an imaging apparatus was zooming, panning or tilting, and
   wherein said determining unit is configured to determine that the current image to be coded is included in the picture group when the obtained imaging information indicates that the imaging apparatus was zooming, panning, or tilting.

3. The image coding apparatus according to claim 2,
   wherein the imaging information indicates whether or not the imaging apparatus is changing an aperture, and
   wherein said determining unit determines that the current image to be coded is included in the picture group when the obtained imaging information indicates that the aperture is not changing, or when the obtained imaging information indicates that the aperture is changing and that the imaging apparatus was zooming, panning, or tilting.

4. The image coding apparatus according to claim 1, further comprising a parameter setting unit configured to set the predetermined offset value at a predetermined value for at least the reference image to which the current image to be coded refers, wherein the moving picture data is interlaced moving picture data, wherein said parameter setting unit is configured to set, at 0, the predetermined offset value of a reference image which has a parity opposite to a parity of the current image to be coded when said determining unit determines that the current image to be coded is included in the picture group, and wherein said predicted image generating unit is configured to generate the predicted image by adding the predetermined offset value set by said parameter setting unit and the reference image to which the current image to be coded refers, when said determining unit determines that the current image to be coded is included in the picture group.

5. The image coding apparatus according to claim 1, wherein said determining unit is configured to determine that the current image to be coded is included in the picture group when a characteristic amount calculated based on a previously coded image is equal to or larger than a predetermined threshold, and to determine that the current image to be coded is not included in the picture group when the characteristic amount is smaller than the predetermined threshold.

6. The image coding apparatus according to claim 1, wherein said image coding apparatus compression-codes the moving picture data according to an MPEG-4 AVC/H.264 compression-coding standard, and wherein said image coding apparatus further comprises a parameter setting unit configured to set the predetermined offset value in an Implicit mode or an Explicit mode.

7. The image coding apparatus according to claim 6, wherein said parameter setting unit is configured to set the predetermined offset value based on an amount of change in an average luminance value of the current image to be coded and an average luminance value of the reference image.

8. An image coding method of compression-coding moving picture data including a current image to be coded, said image coding method comprising:

determining, via a determining unit of an image coding apparatus, whether or not the current image to be coded is included in, among the moving picture data, a picture group which is a group of successive pictures and (ii) indicates motion equal to or larger than a predetermined amount of motion;

generating, via predicted image generating unit of the image coding apparatus, a predicted image of the current image to be coded, based on a reference image accumulated in a memory, the predicted image being generated by performing motion compensation with weighted prediction or motion compensation without the weighted prediction, the weighted prediction being a process of adding a predetermined offset value to a pixel value of the reference image; and coding, via a coding unit of the image coding apparatus a difference between the predicted image that has been generated and the current image to be coded, wherein, in said generating of the predicted image, the predicted image is generated by performing the motion compensation without the weighted prediction when a result of said determining indicates that the current image to be coded is included in, among the moving picture data, the picture group indicating the motion equal to or larger than the predetermined amount of motion, and (ii) the predicted image is generated by performing the motion compensation with the weighted prediction when the result of said determining indicates that the current image to be coded is not included in the picture group.

* * * * *